United States Patent
Lott et al.

(10) Patent No.: US 9,826,409 B2
(45) Date of Patent: Nov. 21, 2017

(54) ADAPTIVE SEMI-STATIC INTERFERENCE AVOIDANCE IN CELLULAR NETWORKS

(75) Inventors: Christopher Gerard Lott, San Diego, CA (US); Donna Ghosh, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1211 days.

(21) Appl. No.: 12/603,736

(22) Filed: Oct. 22, 2009

(65) Prior Publication Data

US 2010/0136998 A1    Jun. 3, 2010

Related U.S. Application Data

(60) Provisional application No. 61/108,310, filed on Oct. 24, 2008.

(51) Int. Cl.
   *H04W 16/14* (2009.01)

(52) U.S. Cl.
   CPC .................................. *H04W 16/14* (2013.01)

(58) Field of Classification Search
   CPC . H04W 16/10; H04W 72/042; H04W 72/082; H04W 72/085; H04W 16/04
   USPC ........................ 370/349; 455/453, 447, 452.2
   See application file for complete search history.

(56) References Cited

U.S. PATENT DOCUMENTS

| | | | |
|---|---|---|---|
| 6,898,431 B1 * | 5/2005 | Peele | 455/453 |
| 2002/0126650 A1 * | 9/2002 | Hall et al. | 370/349 |
| 2003/0231586 A1 * | 12/2003 | Chheda | H04W 28/18 370/230 |

(Continued)

FOREIGN PATENT DOCUMENTS

| | | |
|---|---|---|
| JP | 2002044718 A | 2/2002 |
| JP | 2006504356 A | 2/2006 |

(Continued)

OTHER PUBLICATIONS

International Search Report & Written Opinion—PCT/US09/061808, International Search Authority—European Patent Office—dated Feb. 18, 2010.

(Continued)

*Primary Examiner* — George Eng
*Assistant Examiner* — Jing Gao
(74) *Attorney, Agent, or Firm* — Holland & Hart LLP

(57) ABSTRACT

Techniques for the reuse of airlink resources in a cellular network are disclosed. A base station controller may gather information about load levels at adjacent sectors of the cellular network. The base station controller may generate and distribute a reuse reference to base stations serving mobile devices in the adjacent sectors. Alternatively, the base station controller may provide the load level information to base stations serving the adjacent sectors and the base stations may determine a sector reuse pattern. The reuse reference or reuse pattern may be adapted to sector load conditions and may designate any combination of carriers, time slots, and power levels for data transmission in a sector. The base stations may schedule data transmission to mobile devices in their respective sectors according to the reuse reference or reuse pattern. The base stations may modify their resource usage in response to changes in sector load.

39 Claims, 10 Drawing Sheets

(56) References Cited

U.S. PATENT DOCUMENTS

| | | | |
|---|---|---|---|
| 2004/0008726 A1* | 1/2004 | Kelly | H04L 12/2854 |
| | | | 370/468 |
| 2004/0063433 A1* | 4/2004 | Garrison | 455/447 |
| 2007/0010270 A1* | 1/2007 | Dillon | 455/513 |
| 2007/0155431 A1* | 7/2007 | Munzner et al. | 455/560 |
| 2007/0225012 A1* | 9/2007 | Chang et al. | 455/452.2 |
| 2008/0219286 A1* | 9/2008 | Ji | H04L 12/413 |
| | | | 370/445 |
| 2009/0069023 A1* | 3/2009 | Ahn et al. | 455/450 |

FOREIGN PATENT DOCUMENTS

| | | | |
|---|---|---|---|
| JP | 2007258844 A | 10/2007 | |
| JP | 2008067121 A | 3/2008 | |
| WO | WO2004042971 | 5/2004 | |
| WO | WO 2007045101 A2 * | 4/2007 | |
| WO | 2008004561 A1 | 1/2008 | |
| WO | WO 2008018745 A2 * | 2/2008 | H04Q 7/38 |

OTHER PUBLICATIONS

Taiwan Search Report—TW098136217—TIPO—dated Dec. 17, 2012.

* cited by examiner

Sector α

Sector β

Sector γ

ADAPTIVE SEMI-STATIC INTERFERENCE AVOIDANCE IN CELLULAR NETWORKS

CROSS-REFERENCE TO RELATED APPLICATION

This application claims the benefit of U.S. Provisional Application No. 61/108,310, filed Oct. 24, 2008, entitled "Adaptive Semi-Static Interference Avoidance in Single and Multi-Carrier 1×EV-DO Networks," which is incorporated herein by reference for all purposes.

BACKGROUND

Wireless communication systems are widely deployed to provide communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of terminals. The system may support operation on multiple carriers. Each carrier may be associated with a particular center frequency and a particular bandwidth. Each carrier may carry pilot and overhead information to support operation on the carrier. Each carrier may also carry data for terminals operating on the carrier. Some transmissions between a terminal and a base station may cause interference to, and may also observe interference from, other transmissions in the communication system. Such interference can adversely impact the performance of all affected base stations.

SUMMARY

Techniques for the reuse of airlink resources in a cellular network are disclosed. A base station controller may gather information about load levels at adjacent sectors of the cellular network. The base station controller may generate and distribute a reuse reference to base stations serving mobile devices in the adjacent sectors. Alternatively, the base station controller may provide the load level information to base stations serving the adjacent sectors and the base stations may determine a sector reuse pattern. The reuse reference or reuse pattern may be adapted to sector load conditions and may designate any combination of carriers, time slots, and power levels for data transmission in a sector. The base stations may schedule data transmission to mobile devices in their respective sectors according to the reuse reference or reuse pattern. The base stations may modify their resource usage in response to changes in sector load and may allocate airlink resources differently among users within each sector.

In one embodiment, a method of reusing airlink resources at a base station controller is disclosed. The method includes receiving information at the base station controller relating to load levels at adjacent sectors in a cellular network. The method also includes generating a reuse reference for a first sector in adjacent sectors based on the load level information. The reuse reference includes airlink resources designated for forward link data transmission in the first sector.

The method also includes sending the reuse reference from the base station controller to a first base station serving mobile devices in the first sector. Generating the reuse reference may include determining a scheduling delay of the adjacent sectors, interference metrics associated with forward link transmissions in the adjacent sectors, effective bandwidth usage in the adjacent sectors, and a partial load performance capability of mobile devices in the adjacent sectors. The reuse reference may specify adding at least one carrier or time slot for forward link data transmission in the first sector in response to an increase in the load of the first sector. Also, the reuse reference may specify discontinuing use of at least one carrier or time slot for forward link data transmission in the first sector in response to an increase in the load of an adjacent sector.

A method of reusing airlink resources at a base station is also disclosed. The method includes receiving sector load information for adjacent sectors in a cellular network at the base station. The sector load information is received from a base station controller. The method includes generating a reuse pattern based on the sector load information for forward link data transmission in a first sector served by the base station. The reuse pattern includes at least one carrier or time slot for use in the first sector. The method includes sending data from the base station to mobile devices in the first sector according to the reuse pattern. The information received at the base station can include a scheduling delay of the adjacent sectors, interference metrics associated with forward link transmissions in the adjacent sectors, effective bandwidth usage in the adjacent sectors, and/or a partial load performance capability of mobile devices in the adjacent sectors.

The method of reusing airlink resources at a base station may include determining a load level in the first sector and either adding or discontinuing use of at least one carrier or time slot in the first sector in response to a change in the load level. The at least one carrier or time slot may be determined according to the reuse pattern. The method may also include determining a signal quality for each of a plurality of mobile devices in the first sector and grouping the mobile devices into at least a first group and a second group based on the signal quality. The method may include scheduling data transmission to the first group of mobile devices in a first slot of the time division multiplexed carrier designated for use in the first sector and scheduling data transmission to the second group of mobile devices in a second slot of the time division multiplexed carrier designated for use in the first sector in common with one or more of the adjacent sectors.

In another embodiment, a base station controller is disclosed. The base station controller includes a load monitor that obtains sector load information for adjacent sectors in a cellular network. A reuse reference generator is coupled to the load monitor and generates a reuse reference based on the sector load information. The reuse reference includes airlink resources designated for use in each of the adjacent sectors. From time to time, the base station controller sends the reuse reference to base stations serving the adjacent sectors.

In the figures, similar components and/or features may have the same reference label. Also, various components of the same type may be identified by following the reference label with a dash and a second label that distinguishes among the similar components. If only the first reference label is used, the description is applicable to any of the similar components designated by the first reference label.

DETAILED DESCRIPTION

The techniques described herein may be used with various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95 and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). CDMA2000 and UMB are described in documents from an organization named "3$^{rd}$ Generation Partnership Project 2" (3GPP2). The techniques described herein may be used for the systems and radio technologies mentioned above as well as other systems and radio technologies. For clarity, certain aspects of the techniques are described below for HRPD.

Figure 1:
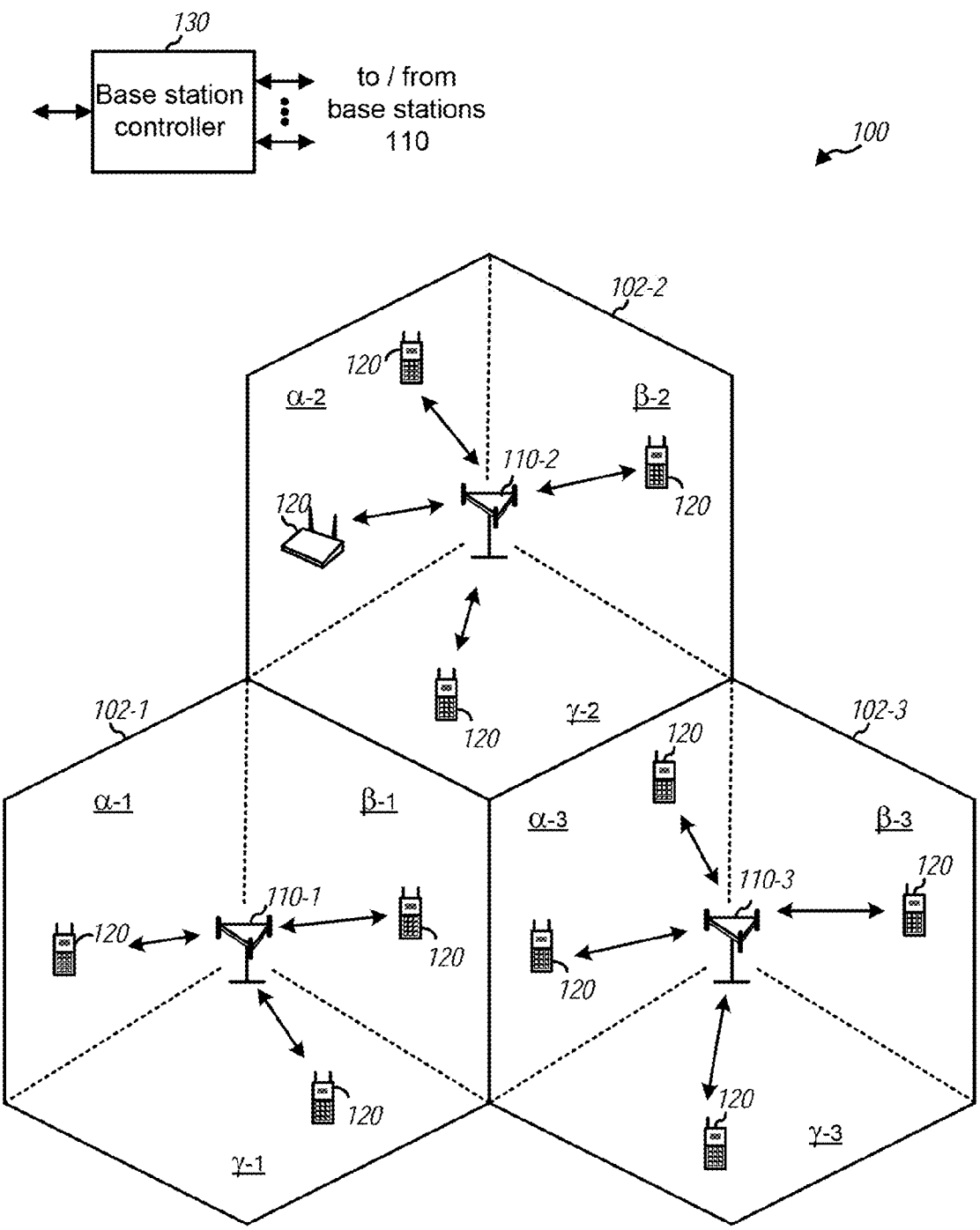
FIG. 1 shows a wireless communication system.

FIG. 1 shows a wireless communication system 100 with multiple base stations 110. System 100 may support operation on multiple carriers. A multi-carrier transmitter can transmit one or multiple modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc.

A base station 110 (BTS) may be a station that communicates with wireless access terminals and may also be referred to as an access point, a Node B, an evolved Node B (eNB), etc. Each base station 110 can provide communication coverage for a particular geographic area 102. To improve system capacity, the coverage area 102 of a base station 110 may be partitioned into multiple (e.g., three) smaller areas. Each smaller area may be served by a respective base station subsystem. As defined by the "3$^{rd}$ Generation Partnership Project 2" (3GPP2), the term "sector" or "cell-sector" can refer to the smallest coverage area of a base station and/or a base station subsystem. For clarity, the coverage area 102 of each base station 110 will be described as having three sectors ($\alpha$, $\beta$, $\gamma$).

System 100 may include only macro base stations or it can have base stations of different types, e.g., macro, pico, and/or femto base stations. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home). The techniques described herein may be used for all types of base stations.

Base stations 110 communicate with terminals 120 via forward and reverse links. The forward link (or downlink) refers to the communication link from a base station 110 to a terminal 120, and the reverse link (or uplink) refers to the communication link from a terminal 120 to a base station 110. Terminals 120 can be dispersed throughout system 100 and can include cellular phones, personal digital assistants (PDAs), wireless communication devices, handheld devices, netbooks, notebook computers, etc. As used herein, terminals 120 may also be referred to as access terminals (ATs), mobile stations, mobile devices, user equipment (UE), or subscriber units.

A base station controller (BSC) 130 may be coupled to base stations 110 and provide coordination and control via a backhaul. Base stations 110 may communicate various performance metrics to base station controller 130 and base station controller 130 may determine the relative demand for service in each sector based on the performance metrics. For example, from time to time, each base station 110 can provide scheduling delay information as well as interference metrics for each of its sectors (or sector-carrier pairs) to base station controller 130. When scheduling delay increases, it can indicate higher sector load levels. When the scheduling delay decreases, it can indicate that the sector is lightly loaded. Interference metrics can provide information about the extent to which each carrier in a sector is affected by transmissions in adjacent sectors. Note that, as used herein, the term "adjacent sectors" includes sectors that are adjacent in an RF (radio-frequency) sense and is not limited to physical adjacency. For example, two sectors may be considered to be adjacent when communications in one sector may interfere with communications in another sector even if the sectors are not contiguous. The term "neighbor sectors" may also be used to describe RF adjacency.

Base stations 110 can also communicate information about the amount of fixed rate and best effort traffic in their sectors to the base station controller 130. For example, a base station 110 may allocate bandwidth to meet minimum service levels associated with different types of traffic such as expedited forwarding (EF) traffic. This allocation can increase effective bandwidth usage in the sector and thus a sector with a higher proportion of EF traffic may be regarded as more heavily loaded than a sector with a similar amount of best effort traffic. Base station controller 130 can monitor such bandwidth requirements and service utilization in the adjacent sectors.

As another measure of system performance, base station controller 130 can track device capabilities as they relate to partial loading. When an access terminal 120 initiates communication with a base station 110, it can advertise its capabilities through a capabilities exchange process. These capabilities can indicate the AT's performance under partial loading conditions. Partial loading conditions may arise when one sector is heavily loaded and an adjacent sector is lightly loaded. This different sector loading can create a mismatch between pilot signal strength and traffic signal strength in the presence of which some terminals 120 will perform poorly while others will be less affected according to their respective capabilities. The base station controller 130 can maintain a database of access terminal capabilities and can use information about the mix of devices in a sector as part of its determination of sector load conditions.

Sector loading can also be based on historical usage. In a given sector, load may vary based on time of day, date of week, etc. For example, a sector may cover a portion of a freeway, and sector load may be heavy during commuting hours and light during non-commuting hours. As another example, a sector may cover a residential area, and the sector load may be heavy during evening hours and light during daytime hours. Base station controller 130 can track sector load information over time and can identify such loading patterns.

Using the sector load information, base station controller 130 can generate a reuse reference for base stations 110-1, 110-2, and 110-3. The reuse reference can take into account the scheduling delay, bandwidth requirements, device capabilities, historical trends, etc. in the adjacent sectors and can provide an airlink allocation that is both tailored to demand levels and designed to reduce adjacent sector interference. "Airlink usage" refers to any combination of time domain, frequency domain, and power domain techniques for data transmission in a sector or group of adjacent sectors. "Airlink resources" refers to individual carriers, time slots, or transmit power levels used for data transmission from a base station 110 to an access terminal 120.

As an example, in a single-carrier 1×EV-DO system, the reuse reference can divide the forward link into four time interlaces and designate each interlace for use by a specific sector (e.g., $\alpha$-1) or a group of adjacent sectors in common (e.g., $\beta$-1, $\gamma$-2). In a multi-carrier 1×EV-DO system, different carrier frequencies (e.g., f1, f2, f3, and f4) can be designated for use in the different sectors and different power levels (e.g., P1, P2, P3, P4) can be assigned to the different carrier frequencies.

The reuse reference can include at least one carrier and/or time interlace that is designated for use in common by a group of three adjacent sectors (e.g., $\beta$-1, $\gamma$-2, $\alpha$-3). The common time slot or carrier can be transmitted at maximum power and is said to have a reuse value of one (k=1). The reuse reference can designate airlink resources for use in a specific sector that are not designated for use in adjacent sectors. For simplicity, these sector-specific resources may be referred to as "reserved" notwithstanding that they may be utilized temporarily by other sectors to provide additional capacity.

The reuse reference generated by base station controller 130 can specify a hard or soft partition of airlink resources. With a hard partition, base station controller 130 downloads an initial time domain, frequency domain, and power domain resource allocation which is then adhered to in the adjacent sectors. For example, base station 110-1 may schedule data transmission for sector $\alpha$-1 in slots 1 and 2, sector $\beta$-1 in slots 1 and 3, and sector $\gamma$-1 in slots 1 and 4. In that case, time slot 1 would be common to each adjacent sector, whereas slots 2, 3, and 4 would be designated for use in specific sectors. The hard-partition can be based on sector load levels and other information available to base station controller 130.

With a soft partition, an initial allocation of airlink resources for each sector can be specified, but base stations 110 may change the initial allocation according to sector load levels. In the above example, data for sector $\alpha$-1 could be transmitted in time slot 2 (reserved for sector $\beta$-1) when the load level of sector $\alpha$-1 exceeds a predetermined threshold. This arrangement allows sector resources to grow softly with increasing demand and to contract when demand is lower. Additional airlink resources can be added or dropped autonomously by the base station 110 without communicating with other network entities. Alternatively or additionally, the reuse reference can specify a sector-specific reuse pattern.

Terminals 120 can select a serving base station 110 and a forward link carrier based on the SINRs for all sectors on all carriers. The selected carrier of the selected sector may have the best SINR among the SINRs for all sectors and all carriers. Alternatively, a terminal 120 may send a pilot measurement report to its serving sector. The pilot measurement report may include a channel quality indicator (CQI) information, which may comprise quantized versions of the SINRs for all sectors and carriers. The serving sector 102 may select a carrier and/or time slot for the terminal based on the CQI information. The SINR of the selected sector/carrier may be mapped to a data rate, e.g., based on a look-up table. The terminal 120 can send a message comprising the data rate (e.g., on a Data Rate Control (DRC) channel in HRPD) to the selected sector.

Terminals 120 may select different carriers (or be assigned to different time slots) in each sector depending upon their location and the prevailing RF environment. For example, in a multi-carrier system, base stations 110 may transmit on a common carrier frequency at a minimum power level. Terminals 120 located closest to a base station 110 (sector-center) may select the common carrier because it provides the best link as determined by SINR measurements. On the other hand, terminals located near the sector-edge may select a reserved carrier. The reserved carrier may be transmitted at the maximum power level and may provide the best signal quality due to a lack of interference from adjacent sectors. A serving base station 110 can also assign a terminal 120 to common or reserved time interlaces based on reported signal quality in the RF environment.

Advantageously, adapting airlink usage based on sector load levels can reduce interference between adjacent sectors and can improve overall user experience in communication system 100. For example, forward link transmissions from adjacent sectors in a common time slot t may create adjacent sector interference and, as a result, the data rate may need to be reduced in each sector to ensure reliable reception. The effect of the interference may vary within the sector and may be felt most strongly at the sector-edge such that a greater amount of system resources must be devoted to providing edge users with a minimum quality of service. The techniques described herein enable a demand-driven allocation across sectors and can exploit different interference patterns associated with common and reserved airlink resources to better serve users.

Figure 2:
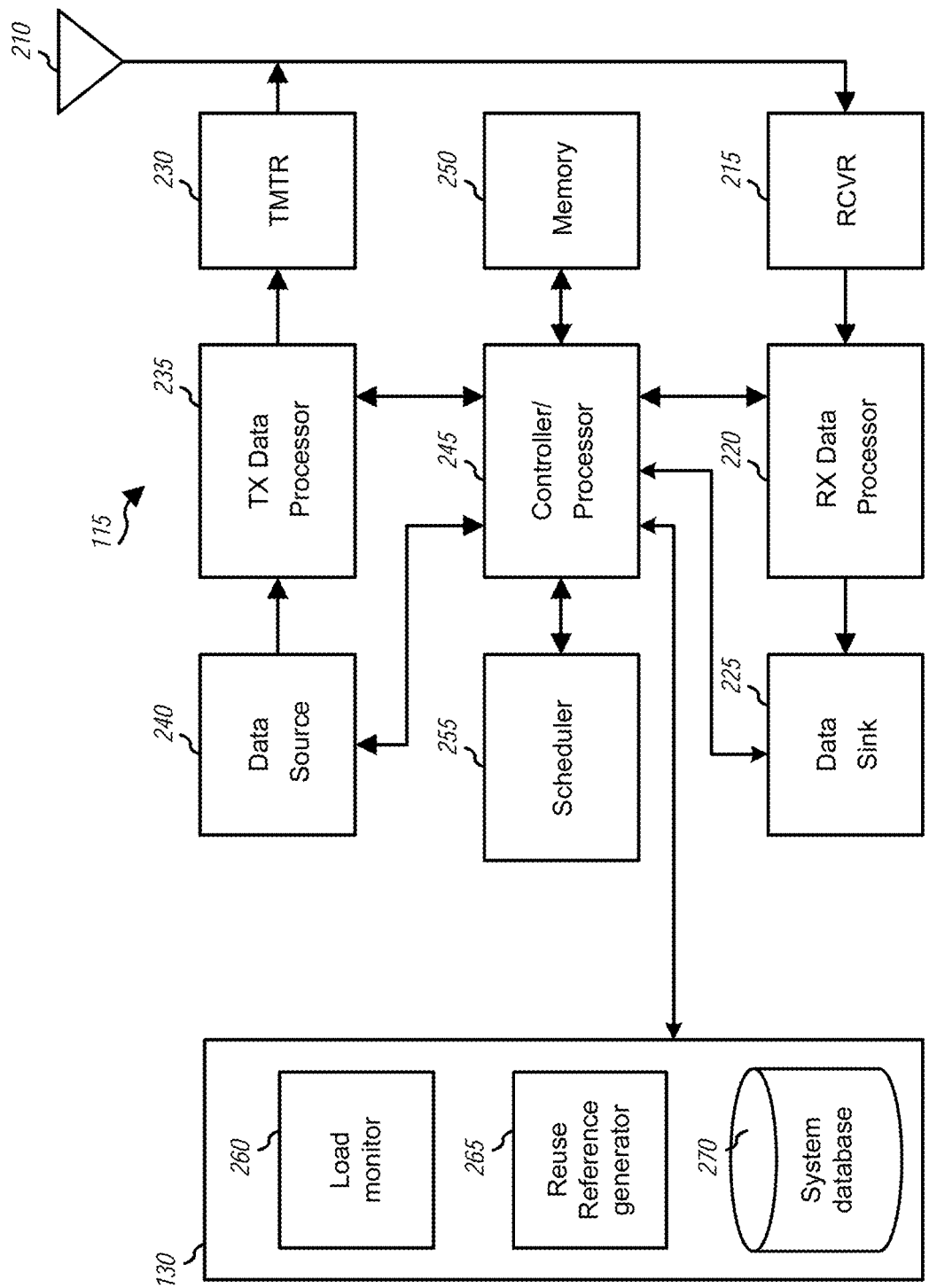
FIG. 2 shows a block diagram of a base station and a base station controller.

FIG. 2 is an exemplary block diagram of a base station subsystem 115 and a base station controller 130. Base stations 110 may include a subsystem 115 for communicating with terminals 120 in each sector of their respective coverage areas 102. For example, base station 110-1 may include three subsystems 115 designated to serve different sectors (α-1, β-1, γ-1) in its coverage area 102-1.

As shown, subsystem 115 includes an antenna 210 for receiving uplink signals from terminals 120. A receiver (RCVR) 215 is coupled to antenna 210 and may process the reverse link signals to provide input samples. An RX data processor 220 coupled to the receiver 215 may process the input samples. The RX data processor 220 may provide decoded data for each terminal to a data sink 225 and decoded control information to a controller/processor 245.

A transmit (TX) data processor 235 may receive data from a data source 240 for terminals in the sector that are scheduled for downlink transmission and may store the data in a sector transmit buffer. TX data processor 235 may also receive overhead information from controller/processor 245. TX data processor 235 may process (e.g., encode, interleave, modulate) the data in the transmit buffer and obtain data symbols for all terminals. TX data processor may also process the overhead information and obtain overhead symbols. TX data processor 235 may further process the data symbols, overhead symbols, and pilot symbols (e.g., for CDMA, OFDMA, etc.) to generate output samples. The output samples can be sent to terminals 120 according to their particular data rates.

A transmitter (TMTR) 230 is coupled to TX data processor 235 and may process (e.g., convert to analog, amplify, filter, and frequency upconvert) the output samples and generate a forward link signal. The forward link signal may be transmitted to terminals 120 operating via the one or more antennas 210.

Processor 245 directs operation of the subsystem 115 and can include one or more processing units such as general purpose or application-specific microprocessors. As shown, processor 245 is coupled to TX data processor 235 and to a scheduler 255. Scheduler 255 schedules forward link data transmissions to terminals 120 in the sector according to their selected data rates. Processor 245 is also coupled to a memory 250. Memory 250 can include one or more volatile and/or non-volatile computer-readable storage elements that store data and program instructions used by processor 245 to carry out the operations described herein.

In one embodiment, processor 245 monitors load conditions in a sector served by subsystem 115 and provides load metrics to base station controller 130. As one indication of load, processor 245 can measure a delay of packets in the sector transmit buffer and can send information about the delay in a load message one or more thresholds. For example, if the scheduling delay for packets in the transmit buffer is below a first threshold, the sector may be regarded as lightly loaded. As scheduling delay increases and exceeds the first threshold, the sector can be regarded as moderately loaded. When scheduling delays exceeds a second threshold, the sector can be regarded as heavily loaded. Processor 245 can communicate an average scheduling delay or queue length information to base station controller 130 from time to time or upon request.

Processor 245 can also determine service usage conditions in the sector. Bandwidth requirements for different types of traffic can provide a further indication of sector load. For example, a base station 110 may need to allocate additional resources to ensure a minimum quality of service for expedited forwarding traffic in a particular sector. As a result, a sector can be regarded as more heavily loaded when it has a high proportion of EF traffic than when it has a similar proportion of best efforts traffic. Processor 245 can compare bandwidth requirements for EF traffic to a control value and can communicate its effective bandwidth requirements, effective bandwidth usage, traffic composition, etc. to base station controller 130. As discussed below, processor 245 can adjust airlink usage based on sector load levels. In addition, as discussed below, processor 245 can determine one or more interference metrics affecting forward link transmissions in the sector.

Base station controller 130 is coupled the base stations 110 (and base station subsystems 115) and can include a load monitor 260, a reuse reference generator (RRG) 265, and a system database 270. Load monitor 260 can gather sector load data from base stations 110 and can store it in system database 270. For example, base stations 110 can periodically send a load message with scheduling delay information, interference metrics, effective bandwidth usage, etc. to the base station controller 130. Base station controller 130 can collect and analyze such load information as part of allocating airlink resources to adjacent sectors.

Base station controller 130 can determine an exemplary sector load metric, Neff, for adjacent sectors based on queue-length information received from base stations 110. The exemplary load metric can be determined by filtering a sum of non-empty queues at each sector-carrier in each time slot over a predetermined interval of time.

For sector-carrier pair (s,c) at a time t, Neff may be given as:

$$Neff_{s,c,i} = IIR\left\{\sum_{\substack{m \in \text{Set of ATs} \\ \text{pointing to } s,c \text{ at } t}} I_{Q_{mt}}\right\}, \quad \text{Eq (1)}$$

$$I_{Q_{mt}} = \begin{cases} 1, & \text{if } I_{Q_{mt}} > 0 \\ 0, & \text{otherwise} \end{cases}$$

where $Q_{m,t}$ represents the queue length of access terminal m, and IIR represents an infinite impulse response (IIR) function that filters to the sum of queues to account for measurement fluctuations and other distortions.

The Neff metric of Eq (1) can also reflect the availability of backhaul bandwidth and other system loading conditions. For example, the sum of non-empty queues in the Neff metric can be adjusted based on the amount of backhaul traffic. As traffic between a base station 110 and base station controller 130 increases, the sum can be increased to signify higher load levels. As traffic decreases, the sum can be decreased to reflect lighter load conditions. In general, the load metric can be adjusted by adding, subtracting or scaling according to one or more BTS, BSC, and/or network load measures.

System database 270 may include data sets with current and historical operating information for communication system 100. Database 270 can store sector load information (such as the Neff metric) as well as other information relating demand magnitude, demand location, service utilization, traffic types, and interference levels for each sector in a coverage area 102. In addition, database 270 can store partial load handling information for the access terminals in each sector. The partial load handling information can include the access terminal's negotiated physical and MAC layer protocol subtype numbers. Subtype numbers can be used to infer an access terminal's efficiency in handling pilot and traffic SNR mismatch on the downlink in partially loaded neighbor sector situations.

System database 270 can store a spatial interference map for adjacent sectors in communication system 100. The spatial interference map can include information about the level of interference for each sector-carrier pair resulting from adjacent sector-carriers on the same CDMA channel. The spatial interference map may be relatively static and may reflect long-term radio environment or topology changes such as new building construction, etc.

The base station controller can receive portions of the spatial interference map that are generated at base stations 110. For example, each base station 110 can automatically generate a spatial interference map for its coverage area 102 by collecting data over a relatively long time period. The time period can run from several hours to several days or longer. During the collection interval, a base station can monitor messages from the base station controller 130 to obtain information such as energy-per-chip-to-total-received-power ratio (Ec/Io) or pilot strength for each sector-carrier as reported by ATs. The spatial interference map can also reflect the results of field testing to identify primary interferers to a sector-carrier.

As an exemplary metric for determining spatial interference, base stations 110 can calculate a ratio of the average Ec/Io for non-serving sector-carriers to an average Ec/Io of serving sector-carriers based on active set information reported by terminals 120. The interference metric may be expressed as follows:

$$IF_{s,c} = \bar{x}_{nss}/\bar{x}_{ss} \text{ where } \begin{cases} \bar{x}_{nss} = \text{avg. } Ec/Io \text{ at non-serving } (s, c) \\ \bar{x}_{ss} = \text{avg. } Ec/Io \text{ at serving sector} \end{cases} \quad \text{Eq (2)}$$

Base stations can generate IF metrics for each of their sector-carrier pairs over predetermined measurement intervals and can report the IF metrics to base station controller 130. Base station controller 130 can gather the 4 IF metrics for each sector-carrier and can store them in database 270 as part of a spatial interference map of system 100.

Reference generator (RRG) 265 can combine load metrics (e.g., Neff), interference metrics (e.g., IF), and other information from database 270 to develop a demand profile for each sector in each carrier. Based on the demand profile, RRG 265 can generate a reuse reference designating airlink resources for use by adjacent sectors in system 100. The reuse reference can specify an initial (baseline) allocation of time slots, carriers, and power levels for each group of adjacent sectors α, β, and γ. The reuse reference can include common resources designated for shared use in the adjacent sectors as well as sector-specific resources that are reserved for use in a particular sector or subset of the adjacent sectors.

The reuse reference can specify that carriers are enabled as needed to meet increasing demand for data services. For example, the baseline allocation may specify that carriers are initially disabled and enabled only as sector load exceeds one or more predetermined thresholds. This approach minimizes interference levels can help to reduce base station power consumption. Alternatively, the reuse reference may specify that all carriers in all sectors are enabled by default and disabled when an adjacent sector would benefit from reduced interference, etc. Enabling carriers by default can increase multiplexing gain across carriers and can improve peak rate performance.

Figure 3:
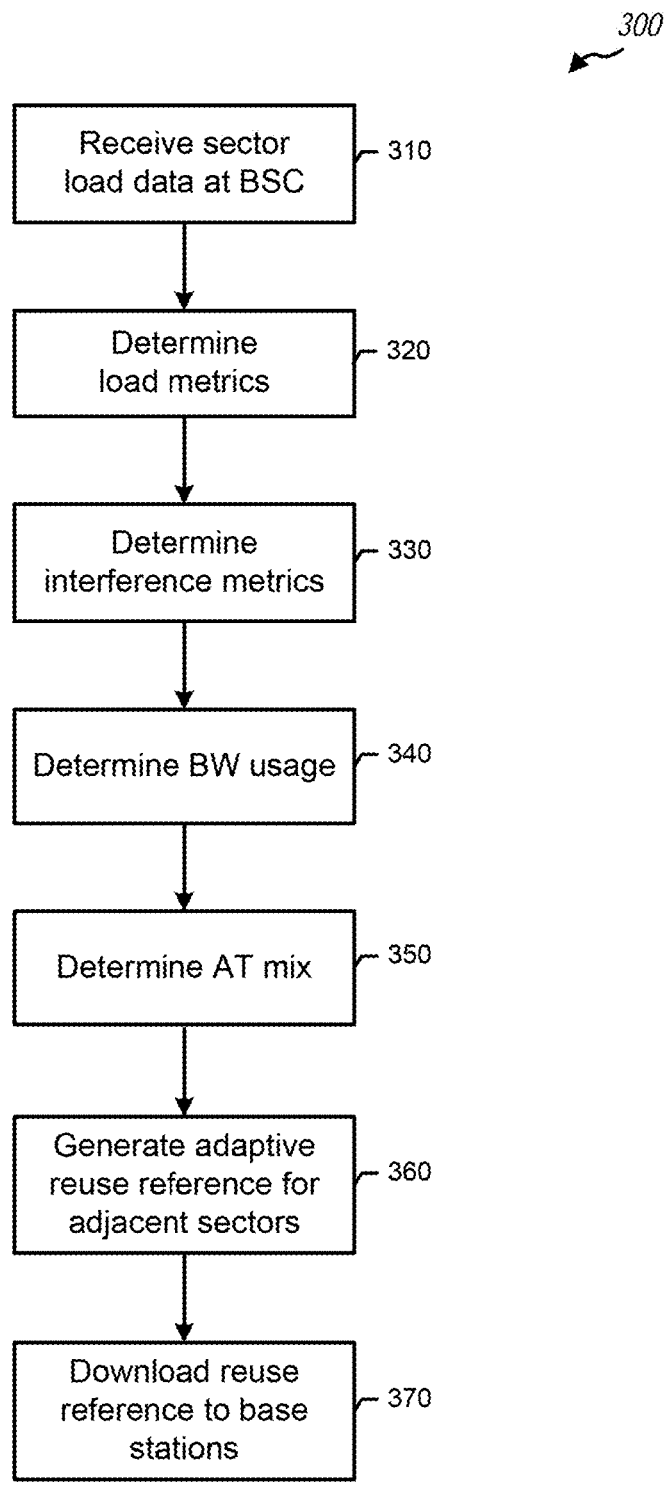
FIG. 3 shows an exemplary process for creating an adaptive reuse scheme.

FIG. 3 shows an exemplary process 300 for creating a reuse reference for adjacent sectors in system 100 that is adapted to sector load conditions. Process 300 can be performed by base station controller 130. At block 310, the base station controller receives information about load levels in the adjacent sectors. For example, load monitor 260 can receive loading information for each sector in communication system 100 and can update the system database based on current load conditions. Alternatively, the base station controller can query one or more base stations 110 that serve the adjacent sectors.

At block 320, the base station controller can determine a scheduling delay at each sector. For example, base stations 110 can provide queuing information and base station controller 130 can determine a load metric such as Neff based on the number of non-empty queues for each sector-carrier pair, or base station controller can determine delay based on some other load metric such average queuing time. Alternatively, the load metric can be calculated by each base station 110 based its sector load conditions and sent to the base station controller. For example, base stations 110 can determine the Neff metric for each of their sector-carriers in a distributed fashion and can transmit it to base station controller 130.

At block 330, the base station controller 130 determines spatial interference metrics for the adjacent sectors. For example, base station controller 130 may generate the IF metric according to Eq. 2 for each adjacent sector based on pilot data stored in system database 270. Alternatively, each base station 110 can calculate IF metrics locally and can send them to base station controller 130. The IF metrics can be used to update a spatial interference map for the network and current interference metrics can be retrieved for use in generating the reuse reference.

Base station controller 130 can also gather an effective BW usage for each sector, block 340, which can reflect the relative amount of EF traffic and other bandwidth or quality of service requirements. At block 350, base station controller 130 determines the AT mix in the adjacent sectors as it relates to their partial loading capabilities. This can include determining a performance capability for each mobile device in each of the adjacent sectors under partial loading conditions. The proportion of devices in each sector which can exploit partial loading conditions can be used to establish thresholds for adding a carrier. For example, a lower load threshold may be used to add a carrier in a sector having a relatively high proportion ATs with good partial loading performance. Similarly, a higher threshold may be used to add a carrier in sectors having a relatively high proportion of ATs with poor partial loading performance.

Based on the sector load information, at block 360, the base station controller generates a reuse reference. The reuse reference can include an initial allocation of airlink resources for each of the adjacent sectors. Load metrics such as Neff and effective BW utilization can be used to determine the carriers, time slots, and transmit power levels designated for use by the adjacent sectors. Interference metrics such as IF can be used to determine an order in which additional airlink resources are added to meet increased demand for data in a given sector. AT mix can be used as a bias in the decision to add time slots or additional carriers to meet increasing demand such as by preferring to add additional carriers in a sector with a relatively high proportion of ATs with poor partial loading performance, and preferring to add time slots in a sector with a high proportion of ATs with good partial loading performance.

The reuse reference generated by the base station controller is adaptive in that it takes into account load levels for each of the adjacent sectors. For example, if sector β-1 tends to be more heavily loaded than adjacent sectors α-3 and γ-2, the reuse reference may allocate an additional carrier or time slots for use by sector β-1. Sector-carrier interference metrics may be utilized in the selection of the additional carriers or time slots which may further depend on the sector AT mix. Alternatively, the reuse reference may specify that the other sectors α-3, γ-2 transmit at reduced power levels or discontinue transmitting on certain carriers utilized in sector β-1 so as to reduce interference to sector β-1 transmissions.

At block 370, base station controller 130 downloads the reuse reference to each base station 110. Alternatively, base stations 110 can request the reuse reference from the base station controller 130 at a predetermined time or upon the occurrence of a specified event.

Referring to FIG. 2, the base station processor 245 can adjust the operation of subsystem 115 based on the reuse reference from base station controller 130. This can include configuring scheduler 255 to schedule the transmission of data from data source 240 on time slots and carriers allocated for use in the current sector. Processor 245 can also establish a transmit power level at transmitter 230 for each allocated carrier. In an exemplary embodiment, processor 245 configures transmitter 245 to transmit at maximum power on the carriers designated for common use.

Base station 110 can monitor sector load levels and can adjust airlink usage as load conditions at base station 110 change. The adjustments can be autonomously determined or they can be specified as part of the reuse reference. For example, with increasing sector load, data can be transmitted in a time slot or carrier that is reserved for an adjacent sector. Base station 110 can also increase its transmit power on a carrier reserved for an adjacent sector. With decreasing load, the additional airlink resources can be relinquished. Processor 245 can determine the manner in which time slots, carriers, and power levels are adjusted at its own initiative. Alternatively, this information can be included as part of the reuse reference provided by base station controller 130.

Figure 4:
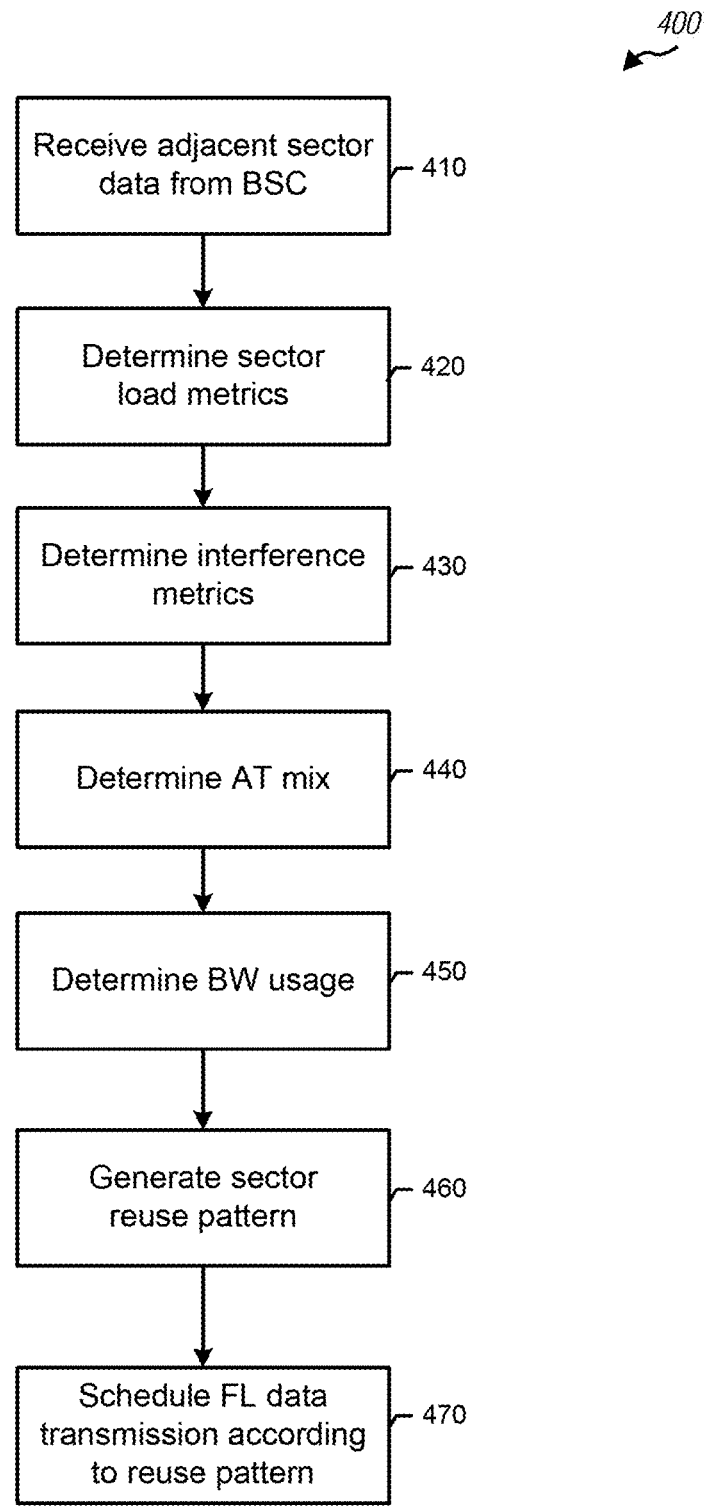
FIG. 4 shows a further exemplary process for creating an adaptive reuse scheme.

FIG. 4 shows an exemplary process 400 for creating a sector reuse pattern for airlink resources based on loading conditions in adjacent sectors. Process 400 can be performed at a base station 110 or a base station subsystem 115.

At block 410, a base station receives load data for adjacent sectors from a base station controller. For example, from time to time, base stations 110 can provide loading information for each sector in each carrier to the BSC. The BSC can aggregate the loading information for adjacent sectors and can distribute aggregate load data for use by the base stations in generating a reuse pattern. With this approach, the collection and distribution of load data can be centralized at the BSC and base stations can generate sector-level reuse patterns in a distributed fashion.

At block 420, the base station determines load metrics for the adjacent sectors. In one embodiment, the base station controller provides the Neff metric of Eq. 1 for adjacent sectors served by neighboring base stations and the base station receiving the load data calculates Neff for its own sectors. At block 430, the base station determines interference metrics for the adjacent sectors. Interference metrics such as the IF metric of Eq. 2 for adjacent sectors can be requested from the base station controller spatial interference map and/or calculated locally. Information about AT mix and effective BW usage in adjacent sectors is gathered at blocks 440, 450.

At block 460, the base station generates a sector reuse pattern. The sector reuse pattern can include an initial allocation of carriers, time slots, and/or transmit power levels for use in the sector and also specify the order in which airlink resources are added or dropped in response to changing load conditions. For example, the initial allocation may account for heavy loading at an adjacent sector by disabling use of carriers and/or time slots. Alternatively, the reuse pattern may be adapted to higher demand in a sector by adding carriers or increasing transmit power levels in a particular sector. At block 470, the base station schedules forward link data transmission in the sector based on the reuse pattern.

Figure 5A:
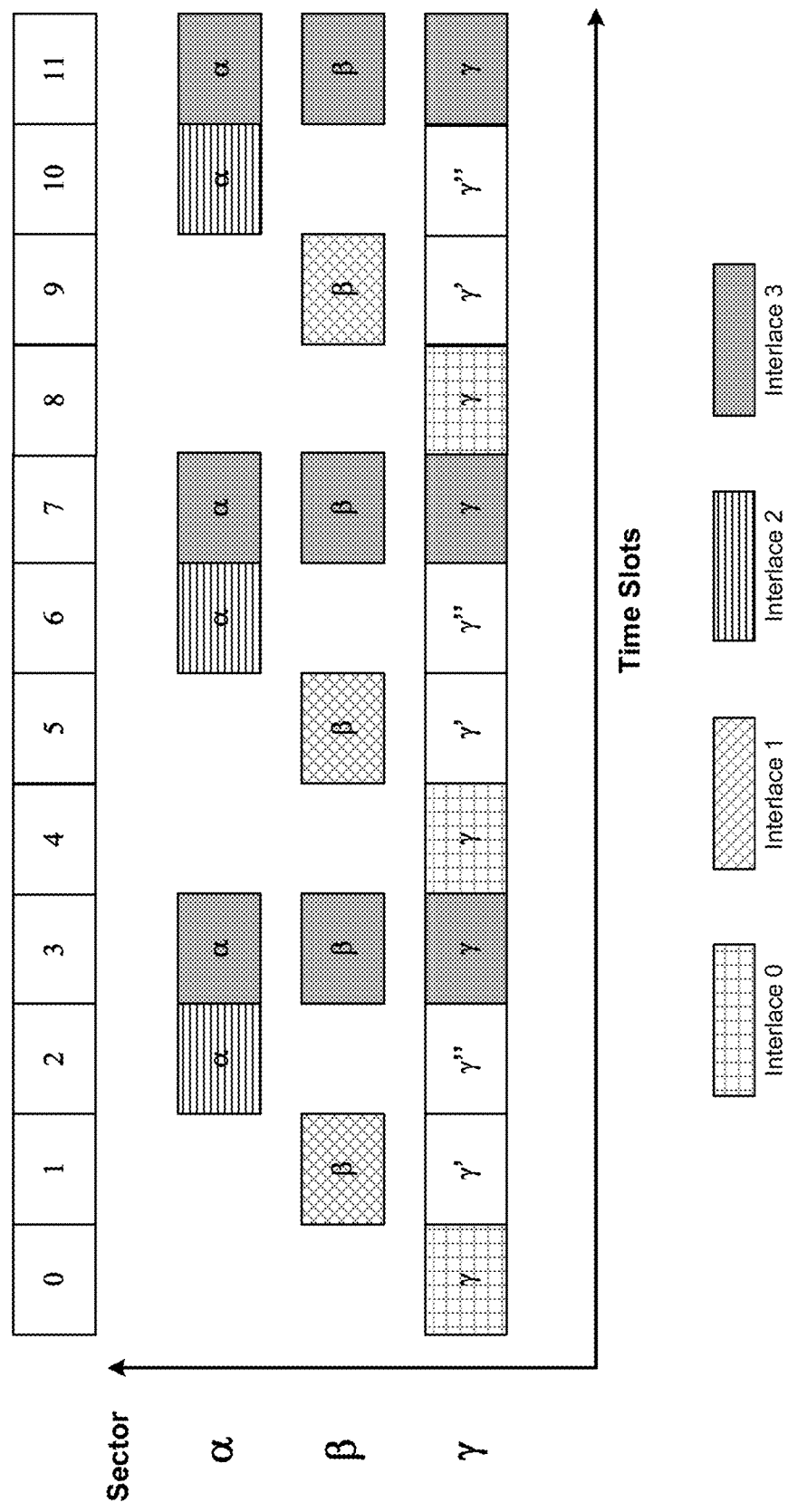
FIG. 5A shows an exemplary carrier allocation in the time domain.

FIG. 5A shows an allocation of time slots in a forward link carrier according to an exemplary reuse scheme. The reuse scheme can be specified as part of a reuse reference generated at a base station controller (FIG. 3) or it can be part of a reuse pattern that is determined at a base station (FIG. 4).

As illustrated, a single carrier is divided into four interlaces (0, 1, 2, and 3) occupying time slots 0-11. Each interlace can be designated for use in a particular sector or group of sectors according to a reuse reference, and forwarding link transmissions for the sectors can be scheduled in the designated time slots. In the example, interlace 0 is designated for use in sector γ, interlace 1 is designated for use in sector β, and interlace 2 is designated for use in sector α. Interlace 3 is designated for use in sectors α, β, and γ in common. Thus, in the example allocation, data transmission in each sector can be scheduled on either a reserved time slot or a shared time slot.

When load levels increase, base station 110 may depart from the initial allocation and schedule data transmission for a sector in time slots that are designated for use by other sectors. The change in loading conditions may be indicated by increased scheduling delays, an increase in the bandwidth requirements needed to maintain a particular service level, a different mixture of access terminals, or any combination of factors. In one embodiment, processor 245 determines an increased load condition when the scheduling delay at base station 110 exceeds one or more delay thresholds.

As shown in the figure, base station 110 responds to an increase in the load at sector γ by causing a scheduler to begin scheduling data transmissions for sector γ (c') on interlace 1. By adding an interlace, the capacity in sector γ increases. However, since interlace 1 is also being utilized in sector β, the increased capacity may create additional interference to transmissions from sector β. If scheduling delay at sector γ continues to increase and exceeds a second threshold, the base station processor can instruct the scheduler to begin scheduling data transmissions for sector γ (c") on interlace 2. In this way, airlink usage for sector γ can increase with increasing demand until available resources are exhausted. As scheduling delay decreases, the base station processor can cause the scheduler to discontinue use of the additional time slots and return to the baseline allocation. Airlink usage for sectors α and β can be modified in a similar manner.

Figure 5B:
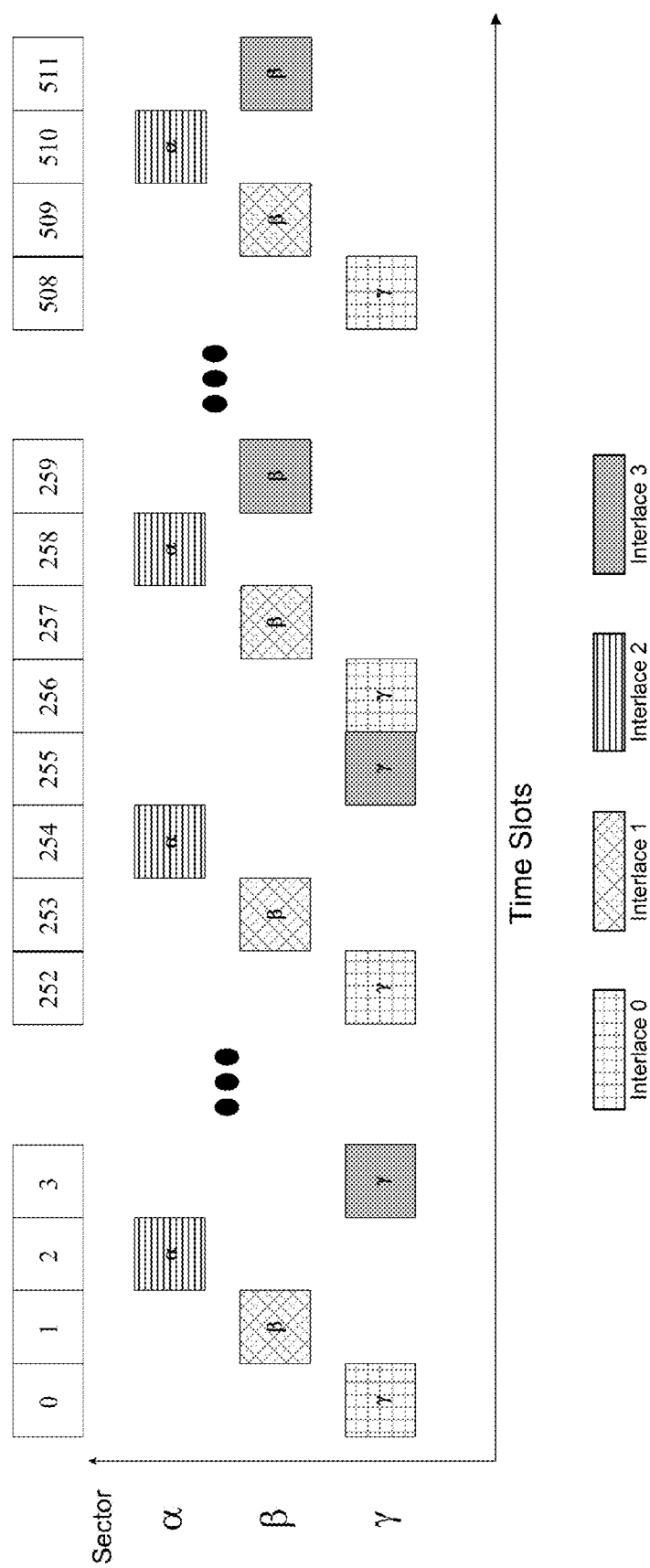
FIG. 5B shows a further exemplary carrier allocation in the time domain.

FIG. 5B shows a further exemplary reuse scheme. In this example, each of the three sectors α, β, and γ is assigned a sector-specific interlace and each alternates in the use of a fourth time interlace at a predetermined interval. As shown, interlace 0 is designated for use in sector γ, interlace 1 is designated for use in sector β, and interlace 2 is designated for use in sector α. Interlace 3 is a common interlace. The common interlace is initially designated for use in sector γ and thus, in time slots 0-255, data transmissions in sector γ can be scheduled on both interlace 0 and interlace 2. At time slot 256, data transmission on the common interlace switches to sector β which can then schedule its transmissions on both interlace 1 and interlace 2 for the next 256 time slot interval.

For simplicity, a fixed interval of 256 time slots is shown. However, the shared interlace can be allocated to different sectors for different intervals to permit fine-grained bandwidth control. For example, depending upon sector loading, the shared interlace can be designated for use in sector β for an interval of 512 time slots and in sector γ for a 256 time slot interval with no allocation for sector α. Note airlink usage for each sector can be modified based on load by adding resources designated for use by adjacent sectors either autonomously or according to a reuse reference.

Figure 6:
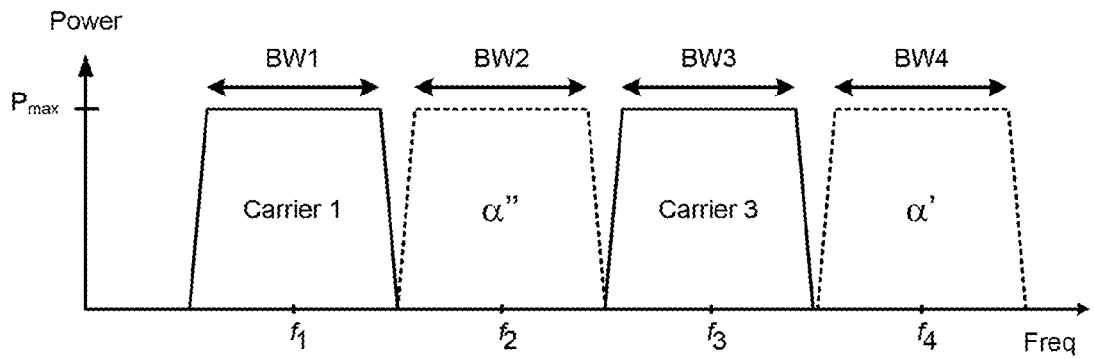
FIG. 6 shows an exemplary carrier allocation in the frequency domain.
Figure 6:
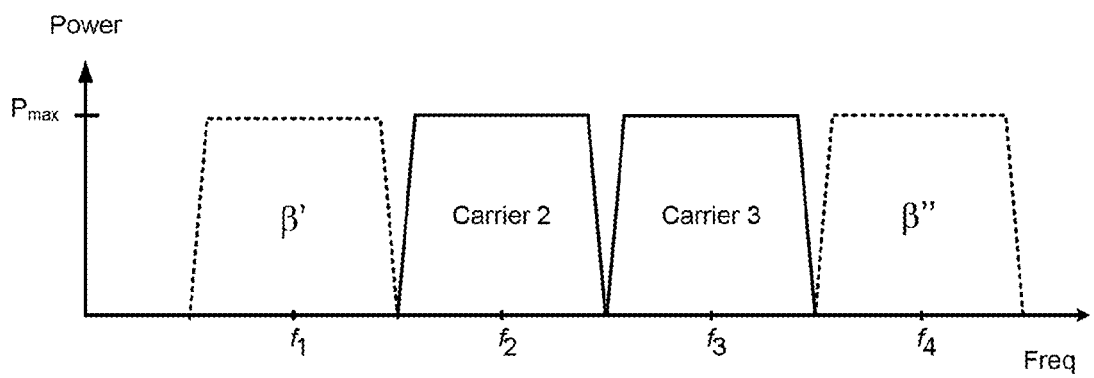
Figure 6:
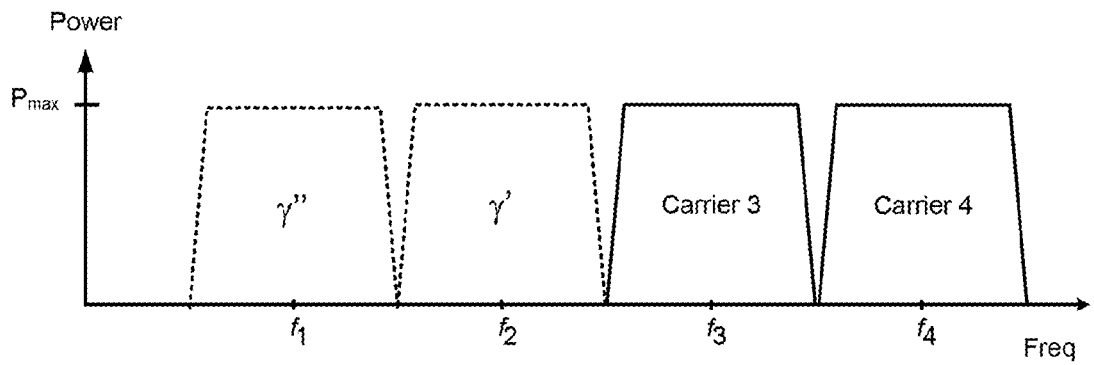

FIG. 6 shows an allocation of carriers in a multi-carrier system according to another reuse scheme such as can be determined by a base station or base station controller. A first of the four carriers has a center frequency of f1 and a bandwidth of BW1, the second carrier has a center frequency of f2 and a bandwidth of BW2, etc. The exemplary carriers can have the same bandwidth (e.g., 1.2288 MHz for cdma2000, 3.84 MHz for WCDMA, or 20 MHz for IEEE 802.11) or different bandwidths which may be configurable. For purposes of illustration, each carrier is shown with a fixed transmit power ($P_{MAX}$).

In the exemplary reuse scheme, carrier f1 is designated for use in sector α, carrier f2 is designated for use in sector β, and carrier f4 is designated for use in sector γ. Carrier f3 is designated for use in all sectors α, β, and γ. As its load increases, data can be scheduled for each of the adjacent sectors on carriers f1, f2, f3, f4 designated for use in other sectors. For example, as effective bandwidth utilization exceeds a first threshold at sector α, the base station processor can schedule forward link transmissions for sector α (α') on carrier f4. As its bandwidth requirements continue to increase, data transmission for sector α (α") can be scheduled on carrier f2.

Airlink usage in other sectors of coverage area 102 can be expanded and contracted in a similar manner. As shown at β', data transmission for sector β can be scheduled on carrier f1 and at β" data for sector β can be transmitted on carrier f4. The same holds for sector γ in which data transmission can be scheduled on carrier f2 (γ') and on carrier f1 (γ") as shown. In this way, airlink usage in each sector can be dynamically adjusted in response to load conditions. Note that the order in which carriers are utilized can be specified in the reuse reference or autonomously determined at the base station.

Figure 7:
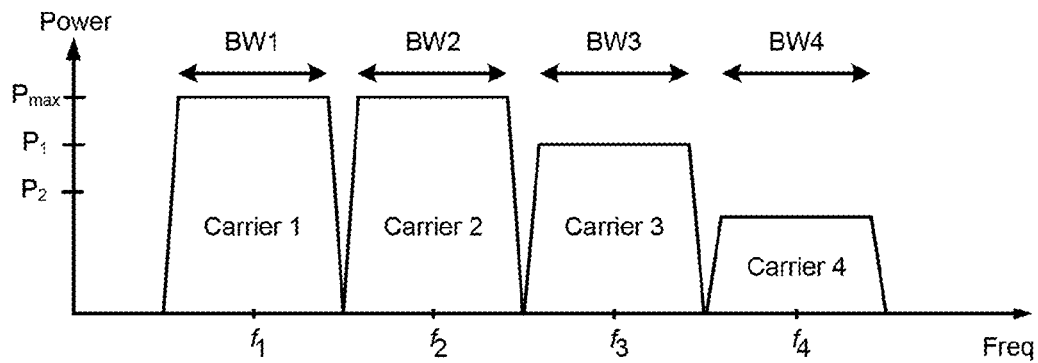
FIG. 7 shows an exemplary carrier allocation in the power domain.
Figure 7:
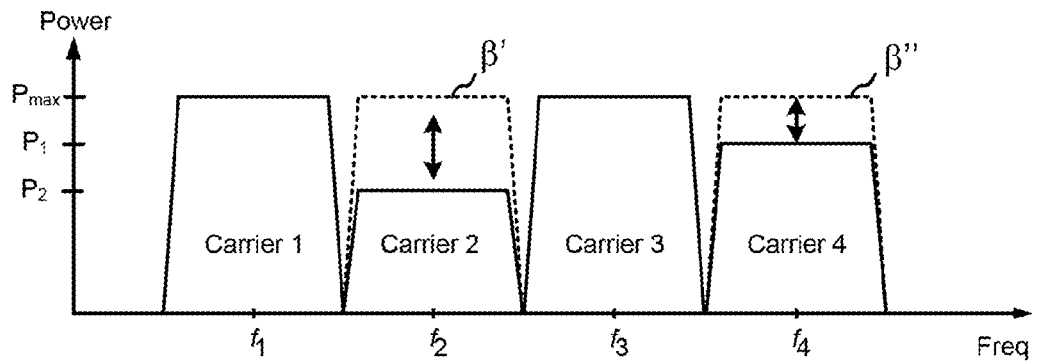
Figure 7:
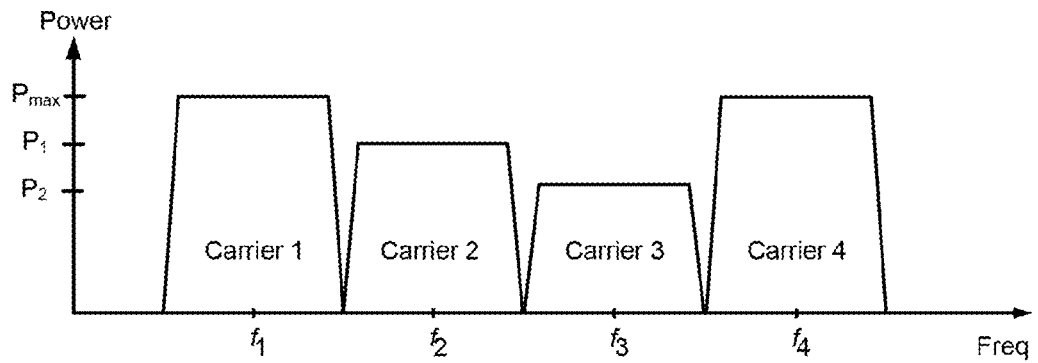

FIG. 7 shows an allocation of carriers according to yet another exemplary reuse scheme that can be determined by a base station or base station controller. In this example, data for each sector is transmitted on all four exemplary carriers albeit at different power levels. As shown, carrier 1 is shared by all sectors and data for each sector can be transmitted on carrier 1 at full power $P_{MAX}$. A second full-power carrier is also designated for use with each sector. In this case, carrier 2 is assigned to sector α, carrier 3 is assigned to sector β, and carrier 4 is assigned to sector γ. Each sector can also use the remaining carriers at reduced power levels P1, P2. The reduced power levels P1, P2 can be lower than $P_{MAX}$ by the same or different amounts.

The varying power levels create a different coverage area in each of the adjacent sectors and base station 110 can manage data transmissions to serve users according to the different coverage areas. As loading increases, the transmit power can be increased beyond P1, P2. For example, as shown by dotted lines, the transmit power level of carrier 2 ((β') and the transmit power of carrier 3 in sector β (b") can be increased from P2 and P1, respectively to $P_{MAX}$ with increasing load levels and can be reduced as load levels subside. Base station 110 can modify transmit power levels in sectors α and β in a similar manner although the dotted lines have been omitted for clarity.

Note that the techniques of FIGS. 5, 6, and 7 can be used in combination. For example, in a multi-carrier system, a different carrier can be designated for use in each adjacent sector and the adjacent sectors can also share interlaces in time division multiplexed carrier. Depending upon load levels, some sectors may initially be assigned only shared resources. In still another variation, sectors can alternate in the use of all time slots in a carrier at predetermined intervals. The present invention is not limited to any particular resource partition but encompasses any combination of the time, frequency, and power domains techniques.

Figure 8:
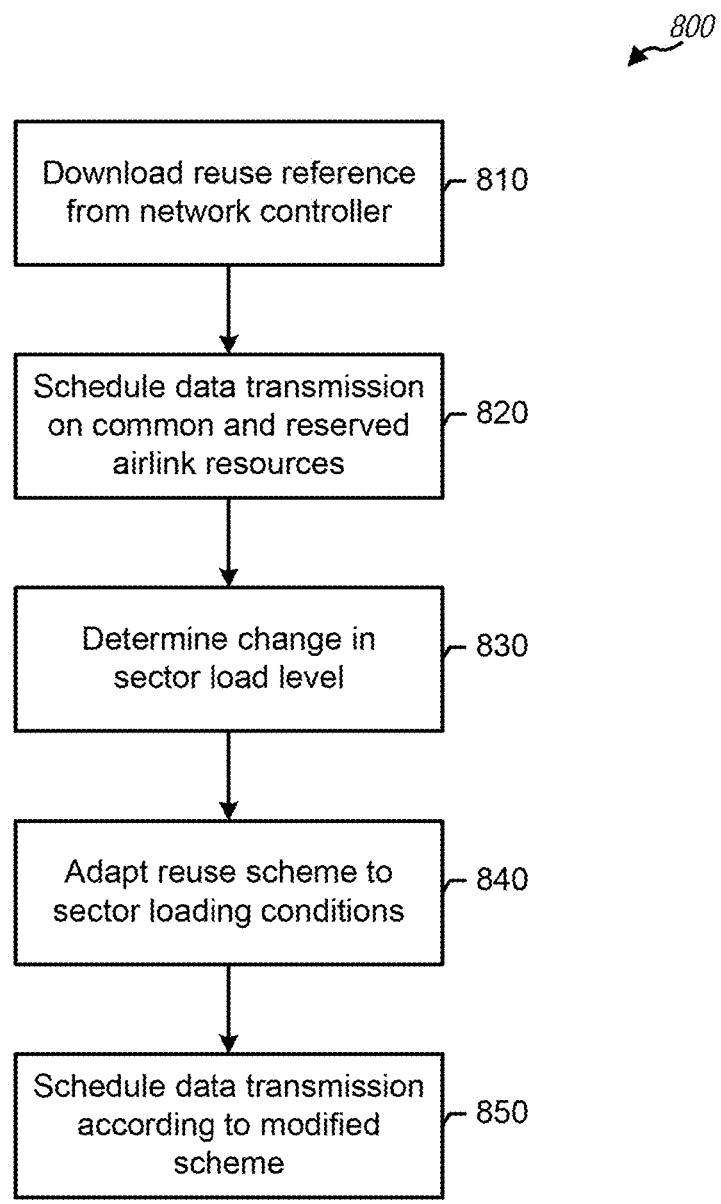
FIG. 8 shows a process for modifying airlink usage based on sector load levels.

FIG. 8 shows an exemplary process 800 for adapting airlink usage based on sector load levels such as can be performed by a base station 110. At block 810, the base station downloads a reuse reference from a base station controller. Alternatively or additionally, the base station controller can push the reuse reference out to the base station from time to time as sector load conditions change.

The reuse reference may provide an initial allocation of airlink resources for sectors in the base station coverage area and preferably includes at least one time slot or carrier that is used in common by adjacent sectors. The reuse reference can also include a combination of time domain, frequency domain, or power domain assignments that are specific to each sector. For example, the base station controller can generate an adaptive reuse reference that assigns a hotspot carrier and/or additional time slots for use by a sector that is experiencing increased scheduling delay or that is serving a high proportion of access terminals that lack partial loading capabilities.

At block 820, the base station 110 can schedule forward link data transmission to the terminals served in a particular sector using either shared or sector-specific airlink resources. As described below, the base station may group users in each sector according to signal strength and may schedule data transmission to users with low signal-to-noise-and-interference (SINR) levels using sector-specific time slots or carriers.

At block 830, the base station detects a change in sector load levels. The change can be based on one or more load metrics. For example, processor 245 (FIG. 2) can monitor scheduling delay in the sector transmit queue and can detect increasing or decreasing load levels in relation to one or more delay thresholds. Sector load can also be based on service level requirements such as bandwidth requirements associated with expedited forwarding traffic, etc. Additionally, AT mix provides an indirect measure of sector load by indicating how effectively access terminals in a sector can utilize airlink resources when pilot and traffic signal quality varies as is common when an adjacent sector is heavily loaded.

When a change in sector load is detected, at block 840, the base station can adapt its reuse scheme to the new loading conditions. For load increases, this can include scheduling data transmission on additional carriers and/or time slots designated for use by adjacent sectors and/or increasing transmit power on selected carriers. For load reduction, adapting the reuse scheme can include suspending use of such additional time slots and/or carriers and/or reducing transmit power.

The base station can change resource usage autonomously such that it determines the time slots, transmit power levels, and/or additional carriers without communicating with other base stations or network entities. Alternatively, the reuse reference can specify the order in which additional airlink resources should be utilized. At block 850, the base station begins scheduling its data transmission according to the modified scheme. In some embodiments, the process may continue at block 830 with the base station monitoring its load level and adapting its airlink usage accordingly.

Figure 9:
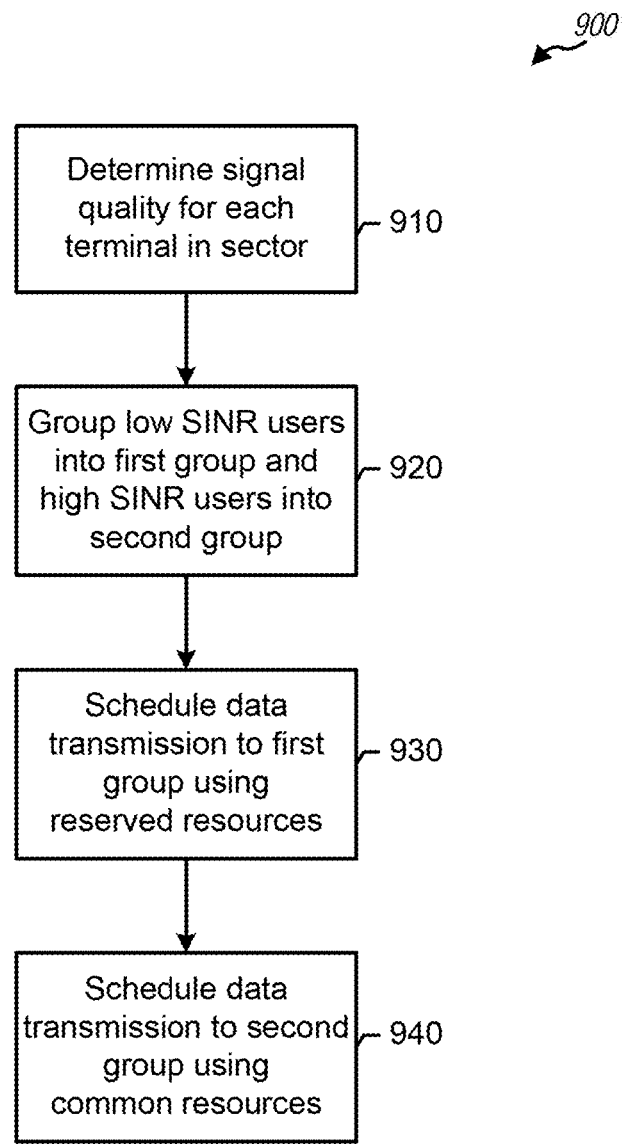
FIG. 9 shows a process for scheduling data transmissions to users in a sector.

FIG. 9 shows an exemplary process 900 for scheduling data transmission according to a reuse scheme such as can be performed by a base station 110. At block 910, the base station determines a signal quality level for each terminal in the sector. The signal quality can include a signal-to-noise-and-interference ratio (SINR), a signal-to-noise ratio (SNR), an energy-per-chip-to-total-received-power ratio (Ec/Io), a carrier-to-total-interference ratio (C/I), or some other quantity available to the base station.

The base station can group the terminals it serves in each sector based on the signal quality metric. For example, at block 920, terminals with a relatively low SINR measurement are added to a first group and those with a relatively high SINR are added to a second group. Terminals in the first group may include a high proportion of sector-edge users. Due to path loss and interference from adjacent sectors, a significant amount of resources may be required to provide the first group of users a minimum data rate needed for satisfactory performance. Terminals in the second group may include a high proportion of sector-center user. These users may experience low levels of path loss and interference from adjacent cells.

The base station can schedule data transmission in each sector based on the user groups. At block 930, the base station schedules data transmission to the first group using sector-specific resources. These sector-specific or reserved resources can be determined according to a reuse reference and can include time slots and/or carriers not utilized by adjacent sectors. The sector-specific resources can also include carriers that are transmitted at higher power levels in a particular sector than in adjacent sectors. These sector-specific resources can offer expanded coverage areas due to reduced interference from neighboring sectors. The base station can bias its scheduling in favor of serving sector-edge users on the reserved resources.

At block 940, the base station schedules data transmission to the second group using airlink resources common to adjacent sectors. This can include time slots and/or carriers that are utilized for data transmission in adjacent sectors. These resources may have reduced coverage areas due to interference from neighboring sectors and thus may be best suited to serve users that are relatively close to the base station. The base station can therefore bias its scheduling in favor of serving sector-center users on the common resources. By partitioning users according to signal strength and biasing its scheduler to serve high SINR users on common resources and low SINR users on sector-specific resources, the base station can use its bandwidth more efficiently. System efficiency is also improved by generating adaptive reuse schemes at the base station controller level that reflect sector loading and modifying such schemes when needed at the base station level.

The various illustrative logical blocks, modules, circuits, and algorithm steps described in connection with the disclosure herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of reusing airlink resources in a cellular network, the method comprising:
receiving information at a base station controller relating to load levels at adjacent sectors in the cellular network;
generating a reuse reference for a first sector of the adjacent sectors based on the load levels information, the reuse reference comprising airlink resources designated for forward link data transmission in the first sector and an order, determined based on computed interference metrics associated with the forward link data transmission in the adjacent sectors, in which the airlink resources are utilized for the forward link data transmission in the first sector; and
sending the reuse reference from the base station controller to a first base station serving mobile devices in the first sector, wherein other of the adjacent sectors are served by one or more other base stations different from the first base station,
wherein the reuse reference comprises a partition of the airlink resources and an indication of whether the partition of the airlink resources is a hard partition or a soft partition of the airlink resources, the hard partition indicating that the first base station must adhere to an allocation of the airlink resources specified in the reuse reference and the soft partition indicating that the first base station can alter the allocation of the airlink resources specified in the reuse reference based on demand, and wherein, for the soft partition, the first base station can autonomously alter the allocation of the airlink resources according to the order specified in the reuse reference to add or drop the airline resources responsive to changing load condition without informing the base station controller or the one or more other base stations.

2. The method of claim 1, wherein the reuse reference specifies adding at least one carrier or time slot for forward link data transmission in the first sector in response to an increase in the load of the first sector.

3. The method of claim 1, wherein the reuse reference specifies discontinuing use of at least one carrier or time slot for forward link data transmission in the first sector in response to decrease in the load of the first sector.

4. The method of claim 1, wherein the reuse reference specifies adding or discontinuing use of at least one carrier or time slot for forward link data transmission in the first sector in response to a load level of sectors adjacent to the first sector.

5. The method of claim 1, wherein generating the reuse reference comprises determining an effective bandwidth usage for each of the adjacent sectors.

6. The method of claim 5, wherein the effective bandwidth usage comprises a proportion of expedited forwarding (EF) traffic at each of the adjacent sectors.

7. The method of claim 1, wherein generating the reuse reference comprises determining a partial load performance of mobile devices in each sector of the adjacent sectors.

8. The method of claim 1, wherein the interference metric is based on pilot strength information obtained from mobile devices in the adjacent sectors.

9. The method of claim 1, wherein the reuse reference comprises at least one time slot reserved for forward link data transmission in the first sector and at least one time slot designated for forward link data transmission in the first sector in common with an adjacent sector.

10. The method of claim 1, wherein the reuse reference indicates airlink resources selected from the group consisting of slots in a time division multiplexed carrier, a plurality of carriers having a same transmit power level, and a plurality of carriers having different transmit power levels.

11. The method of claim 1, wherein the airlink resources comprise at least one time slot, carrier, or carrier transmit power level for forward link data transmission in the first sector.

12. The method of claim 1, wherein the information received at the base station controller comprises an average scheduling delay at each sector in the adjacent sectors.

13. The method of claim 1, wherein the information received at the base station controller relates to a number of non-empty transmit queues at each sector in the adjacent sectors.

14. The method of claim 1, wherein the interference metrics are computed based on one or more of: energy-per-chip-to-total-received power ratio (Ec/Io) for one or more sector carriers, or pilot strength for the one or more sector carriers.

15. The method of claim 14, wherein the interference metrics are computed according to the relationship:

$$IF = x_{nss}/x_{ss}$$

where IF is the computed interference metric, $x_{nss}$ is average Echo at non-serving sector carriers, and $x_{ss}$ is the average Echo at serving carriers.

16. The method of claim 1, wherein a first group of devices are associated with respective signal strength values that do not exceed a pre-determined signal-to-noise-and-interference ratio (SINR), and a second group of devices are associated with the respective signal strength values that exceed the pre-determined SINR.

17. The method of claim 1, wherein a first group of devices are located nearer to the first sector's edges than a second group devices, and the second group of devices are located nearer to the first sector's center than the first group of devices.

18. The method of claim 1, wherein the mobile devices in the first sector are grouped into a first device group and a second device group based on signal quality levels determined for the mobile devices, and wherein the forward link data transmission for the mobile devices are scheduled so mobile devices in the first device group that are located near an edge of the first sector use sector-specific airlink resources designated for use in the first sector and not utilized in the other of the adjacent sectors served by the one or more other base stations, and mobile devices in the second device group that are located near a center of the first sector use common airlink resources shared with other sectors' mobile devices that are located near respective centers of the other of the adjacent sectors served by the one or more other base stations.

19. The method of claim 1, wherein the first base station is associated with a plurality of sectors, and wherein the reuse reference comprises a sector-specific reuse pattern for each of the plurality of sectors associated with the first base station.

20. A base station controller, comprising:
a load monitor configured to obtain sector load information for adjacent sectors in a cellular network; and
a reuse reference generator coupled to the load monitor and configured to generate a reuse reference based on the sector load information, the reuse reference comprising airlink resources designated for forward data transmission use in each of the adjacent sectors and an order, determined based on computed interference metrics associated with the forward link data transmission in the adjacent sectors, in which the airlink resources are utilized for the forward link data transmission in the adjacent sectors,
wherein the base station controller sends the reuse reference to base stations serving the adjacent sectors from time to time, wherein the adjacent sectors are served by one or more base stations different from a first base station serving mobile devices a first sector of the adjacent sectors,
wherein the reuse reference comprises a partition of the airlink resources and an indication of whether the partition of the airlink resources is a hard partition or a soft partition of the airlink resources, the hard partition indicating that the base stations must adhere to an allocation of the airlink resources specified in the reuse reference and the soft partition indicating that the base stations can alter the allocation of the airlink resources specified in the reuse reference based on demand, and wherein, for a soft partition, the first base station can autonomously alter the allocation of the airlink resources according to the order specified in the reuse reference to add or drop the airline resources responsive to changing load condition without informing the base station controller or the one or more other base stations.

21. The base station controller of claim 20, further comprising a spatial interference database configured to store the interference metrics associated with forward link transmissions in the adjacent sectors, wherein the reuse reference generator determines the order for utilizing the airlink resources in the adjacent sectors based on the interference metrics.

22. The base station controller of claim 20, further comprising a device capabilities database, wherein the reuse reference generator determines the airlink resources designated for use in the adjacent sectors based on device capabilities of first terminals operating in the adjacent sectors, the first terminals including second terminals in the one of the adjacent sectors.

23. The base station controller of claim 20, wherein the reuse reference specifies for at least one carrier or time slot for forward link data transmission in a first sector one of: adding the at least one carrier or the time slot for the forward link data transmission in the first sector in response to an increase in the load of the first sector, discontinuing use of the at least one carrier or the time slot for the forward link data transmission in the first sector in response to a decrease in the load of the first sector, or adding or discontinuing use of the at least one carrier or the time slot for forward link data transmission in the first sector in response to a load level of sectors adjacent to the first sector.

24. The base station controller of claim 20, wherein the reuse reference generator configured to generate the reuse reference is configured to:
determine an effective bandwidth usage for each of the adjacent sectors.

25. The base station controller of claim 24, wherein the effective bandwidth usage comprises a proportion of expedited forwarding (EF) traffic at each of the adjacent sectors.

26. The base station controller of claim 20, wherein the reuse reference generator configured to generate the reuse reference is configured to:
determine a partial load performance of mobile devices in each sector of the adjacent sectors.

27. The base station controller of claim 20, wherein the reuse reference generator configured to generate the reuse reference is configured to: determine the interference metric associated with the forward link data transmission in each sector in the adjacent sectors.

28. A base station controller, comprising:
means for receiving information relating to load levels at adjacent sectors in a cellular network;
means for generating a reuse reference for a first sector of the adjacent sectors based on the load levels information, the reuse reference comprising airlink resources designated for forward link data transmission in the first sector and an order, determined based on computed interference metrics associated with the forward link data transmission in the adjacent sectors, in which the airlink resources are utilized for forward link data transmission in the first sector; and
means for sending the reuse reference from the base station controller to a first base station serving mobile devices in the first sector, wherein other of the adjacent sectors are served by one or more other base stations different from the first base station,
wherein the reuse reference comprises a partition of the airlink resources and an indication of whether the partition of the airlink resources is a hard partition or a soft partition of the airlink resources, the hard partition indicating that a base station receiving the reuse reference must adhere to an allocation of the airlink resources specified in the reuse reference and the soft partition indicating that the base station can alter the allocation of the airlink resources specified in the reuse reference based on demand, and wherein, for the soft partition, the first base station can autonomously alter the allocation of the airlink resources according to the order specified in the reuse reference to add or drop the airline resources responsive to changing load condition without informing the base station controller or the one or more other base stations.

29. The base station controller of claim 28, wherein the reuse reference specifies for at least one carrier or time slot for forward link data transmission in the first sector one of: adding the at least one carrier or the time slot for the forward link data transmission in the first sector in response to an increase in the load of the first sector, discontinuing use of the at least one carrier or the time slot for the forward link data transmission in the first sector in response to a decrease in the load of the first sector, or adding or discontinuing use of the at least one carrier or the time slot for forward link data transmission in the first sector in response to a load level of sectors adjacent to the first sector.

30. The base station controller of claim 28, wherein the means for generating the reuse reference comprise:

means for determining an effective bandwidth usage for each of the adjacent sectors.

31. The base station controller of claim 30, wherein the effective bandwidth usage comprises a proportion of expedited forwarding (EF) traffic at each of the adjacent sectors.

32. The base station controller of claim 28, wherein the means for generating the reuse reference comprise:
   means for determining a partial load performance of mobile devices in each sector of the adjacent sectors.

33. The base station controller of claim 28, wherein the means for generating the reuse reference comprise: means for determining the interference metric associated with the forward link data transmission in each sector in the adjacent sectors.

34. A non-transitory computer readable medium comprising instructions that, when executed by one or more processors, cause a base station controller to:
   receive information relating to load levels at adjacent sectors in a cellular network;
   generate a reuse reference for a first sector of the adjacent sectors based on the load levels information, the reuse reference comprising airlink resources designated for forward link data transmission in the first sector and an order, determined based on computed interference metrics associated with the forward link data transmission in the adjacent sectors, in which the airlink resources are utilized for the forward link data transmission in the first sector; and
   send the reuse reference from the base station controller to a first base station serving mobile devices in the first sector, wherein other of the adjacent sectors are served by one or more other base stations different from the first base station,
   wherein the reuse reference comprises a partition of the airlink resources and an indication of whether the partition of the airlink resources is a hard partition or a soft partition of the airlink resources, the hard partition indicating that the first base station must adhere to an allocation of the airlink resources specified in the reuse reference and the soft partition indicating that the first base station can alter the allocation of the airlink resources specified in the reuse reference based on demand, and wherein, for the soft partition, the first base station can autonomously alter the allocation of the airlink resources according to the order specified in the reuse reference to add or drop the airline resources responsive to changing load condition without informing the base station controller or the one or more other base stations.

35. The non-transitory computer readable medium of claim 34, wherein the reuse reference specifies for at least one carrier or time slot for forward link data transmission in the first sector one of: adding the at least one carrier or the time slot for the forward link data transmission in the first sector in response to an increase in the load of the first sector, discontinuing use of the at least one carrier or the time slot for the forward link data transmission in the first sector in response to a decrease in the load of the first sector, or adding or discontinuing use of the at least one carrier or the time slot for forward link data transmission in the first sector in response to a load level of sectors adjacent to the first sector.

36. The non-transitory computer readable medium of claim 34, wherein the instructions that cause the base station controller to generate the reuse reference comprise:
   instructions that cause the base station controller to determine an effective bandwidth usage for each of the adjacent sectors.

37. The base station controller of claim 36, wherein the effective bandwidth usage comprises a proportion of expedited forwarding (EF) traffic at each of the adjacent sectors.

38. The non-transitory computer readable medium of claim 34, wherein the instructions that cause the base station controller to generate the reuse reference comprise:
   instructions that cause the base station controller to determine a partial load performance of mobile devices in each sector of the adjacent sectors.

39. The non-transitory computer readable medium of claim 34, wherein the instructions that cause the base station controller to generate the reuse reference comprise:
   instructions that cause the base station controller to determine the interference metric associated with the forward link data transmission in each sector in the adjacent sectors.

* * * * *